Jan. 3, 1933. LA VERNE C. STURGIS 1,893,153
EGG TRAY FOR INCUBATORS
Filed Oct. 9, 1930
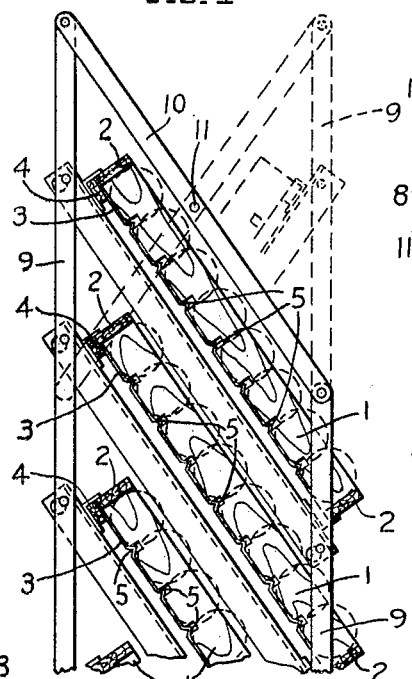
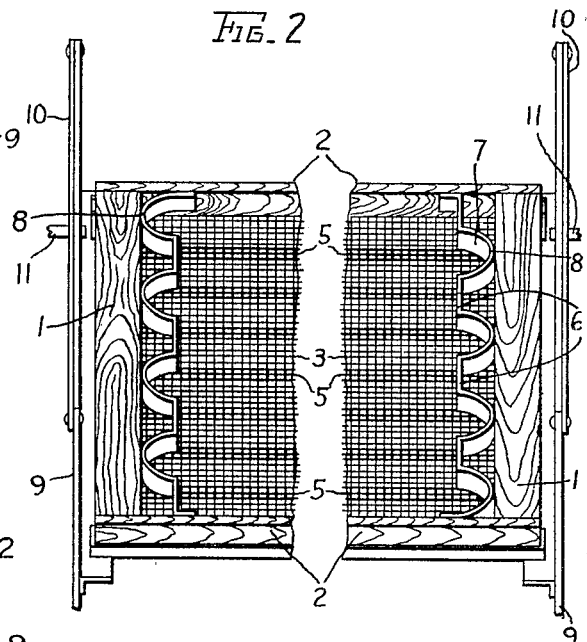
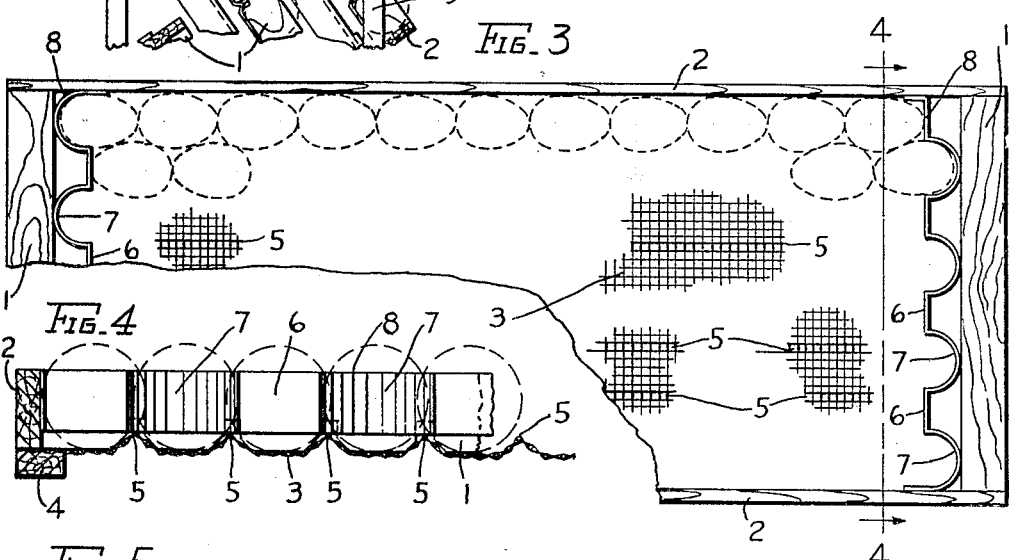
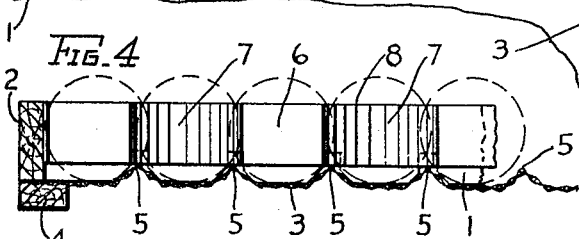
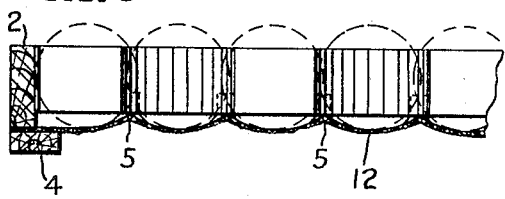
INVENTOR
La Verne C. Sturgis
BY
Staley & Welch
ATTORNEYS Patented Jan. 3, 1933

1,893,153

UNITED STATES PATENT OFFICE

LA VERNE C. STURGIS, OF SPRINGFIELD, OHIO, ASSIGNOR TO THE BUCKEYE INCUBATOR MANUFACTURING COMPANY, OF BEACHWOOD, OHIO, A CORPORATION OF OHIO

EGG TRAY FOR INCUBATORS

Application filed October 9, 1930. Serial No. 487,473.

This invention relates to egg trays for incubators, it more particularly relating to that type of trays known as tiltable trays.

In the art of incubation the preferable manner of placing the eggs in the trays of an incubator is to lay the eggs on their sides, as eggs so placed promote embryological development and give a larger percentage of hatching than when positioned with their small ends down, which is a common practice. It is also the preferable practice to nest the eggs in overlapping relation to allow the trays to accommodate the greatest number of eggs for a given space. When eggs are so placed in a tray of the tiltable type, provision must be made for preventing the eggs from becoming displaced, as displacement causes some of the eggs at the middle of the tray to become up-ended sometimes with the large ends down, in which latter condition the position of the chick becomes reversed with its head in the small end of the egg with consequent bad results in hatching. Further, when the eggs are placed in the trays in this manner there results at the end of each row a space equal to one-half the length of an egg which it has been customary to fill by packing with paper or other material of that kind to prevent end-wise displacement of the eggs.

An object of the invention is to provide a tiltable egg tray which will be effective in maintaining the eggs in proper nested position in the tray when tilted from one position to another.

Another more specific object of the invention is to so construct the foraminous egg supporting bottom of the tray as to prevent the eggs from rolling laterally to an undue extent when the tray is tilted.

Another specific object of the invention is to provide permanent means for closing the spaces at the ends of the rows of eggs to prevent endwise displacement of the eggs in the tray.

In the accompanying drawing:

Fig. 1 is a side elevation of a series of trays embodying my improvements and their supporting and tilting means.

Fig. 2 is a perspective view partly broken away of one of the trays.

Fig. 3 is a top plan view partly broken away of one of the trays.

Fig. 4 is a section on the line 4—4 of Fig. 3.

Fig. 5 is a section of a part of a tray showing a modification.

Referring to the drawing, each of the trays is constructed in the usual way with wooden end strips 1 connected by wooden side strips 2 and a foraminous bottom 3 of wire mesh, the edges of which are secured to wooden strips 4 fastened to the under sides of the ends and sides of the tray. In the present instance, the foraminous bottom 3, which is preferably constructed of wire mesh, is pressed so as to provide a series of parallel upturned ridges 5 extending lengthwise of the tray, these ridges being spaced apart a suitable distance to provide a channel for each row of eggs.

One end of the tray is also provided with a series of abutments 6 and recesses 7 in alternate relation formed in the present case by bending strips of sheet metal 8 to suitable shape, which are tacked or otherwise suitably secured to the inner surfaces of the ends of the tray. These strips are so positioned on the ends of the trays that an abutment at one end of the tray will be in line with a recess at the other end. The recesses are of a depth equal to one-half the length of an average sized egg so that when the eggs are placed in position in overlapping relation as shown in Fig. 3 they will be held against lengthwise movement without the necessity of packing the spaces which would otherwise exist at each end of the row. Further, when the egg trays are tilted as shown in Fig. 1 the ridges 5 serve to prevent the eggs from becoming displaced in a lateral direction and permit the trays to be tilted to the preferable maximum extent which is about 55°.

The tilting device shown in the present case is of a well known form consisting of a pair of parallel rods at each end of the series of trays indicated at 9 connected at the top and bottom by links 10, the bottom one not being shown in the present case, the links being pivoted at their centers, as indicated at 11 in connection with the upper link 10.

In Fig. 5 a slight modification is shown in the form of the foraminous bottom. In this case the bottom indicated at 12 is pressed to a form to provide concave channels which more nearly conform to the shape of the eggs.

Having thus described my invention, I claim:

1. In a non-cellular egg tray for incubators in which the eggs are placed on their sides in rows in overlapping and close relation, a member on each end of the tray forming alternate abutments and recesses, the abutments and recesses of the respective members being in staggered relation, with the abutments extending into the tray a distance substantially equal to one-half the length of an egg.

2. In a tiltable non-cellular egg tray for incubators in which the eggs are placed on their sides in rows in overlapping and close relation, a foraminous bottom for said tray, means forming with said bottom parallel egg receiving channels, and a series of fillers at the ends of the channels connected with the ends of the trays, the fillers on the respective ends of the trays being in staggered relation, each filler projecting into the tray a distance equal to one-half the length of an egg.

3. In a tiltable non-cellular egg tray for incubators in which the eggs are placed on their sides in rows in overlapping and close relation, a foraminous bottom shaped to form a series of up-turned ridges to form a series of parallel egg receiving channels, a series of fillers on the respective ends of the trays arranged in staggered relation to provide one filler for each channel.

4. In a tiltable, non-cellular egg tray for incubators in which the eggs are placed on their sides in rows and in overlapping and close relation, said tray consisting of sides, ends and a foraminous bottom, means on the bottom to form therewith a series of parallel egg receiving channels, and a member on each end of the tray forming alternating recesses and abutments each of a width equal to the width of the channel and in line therewith.

5. In a tiltable, non-cellular egg tray for incubators in which the eggs are placed on their sides in rows and in overlapping and close relation, said tray consisting of sides, ends and a foraminous bottom, means on the bottom to form therewith a series of parallel egg receiving channels, and a metallic strip on each end of the tray formed to provide alternating recesses and abutments each of a width equal to the width of a channel and in line therewith, the recesses of one strip being in line with the abutments of the other strip.

In testimony whereof, I have hereunto set my hand this 13th day of September, 1930.

LA VERNE C. STURGIS.